No. 625,236. Patented May 16, 1899.
H. C. BAILEY.
FILE OR RASP CUTTING MACHINE.
(Application filed Feb. 24, 1899.)
(No Model.)
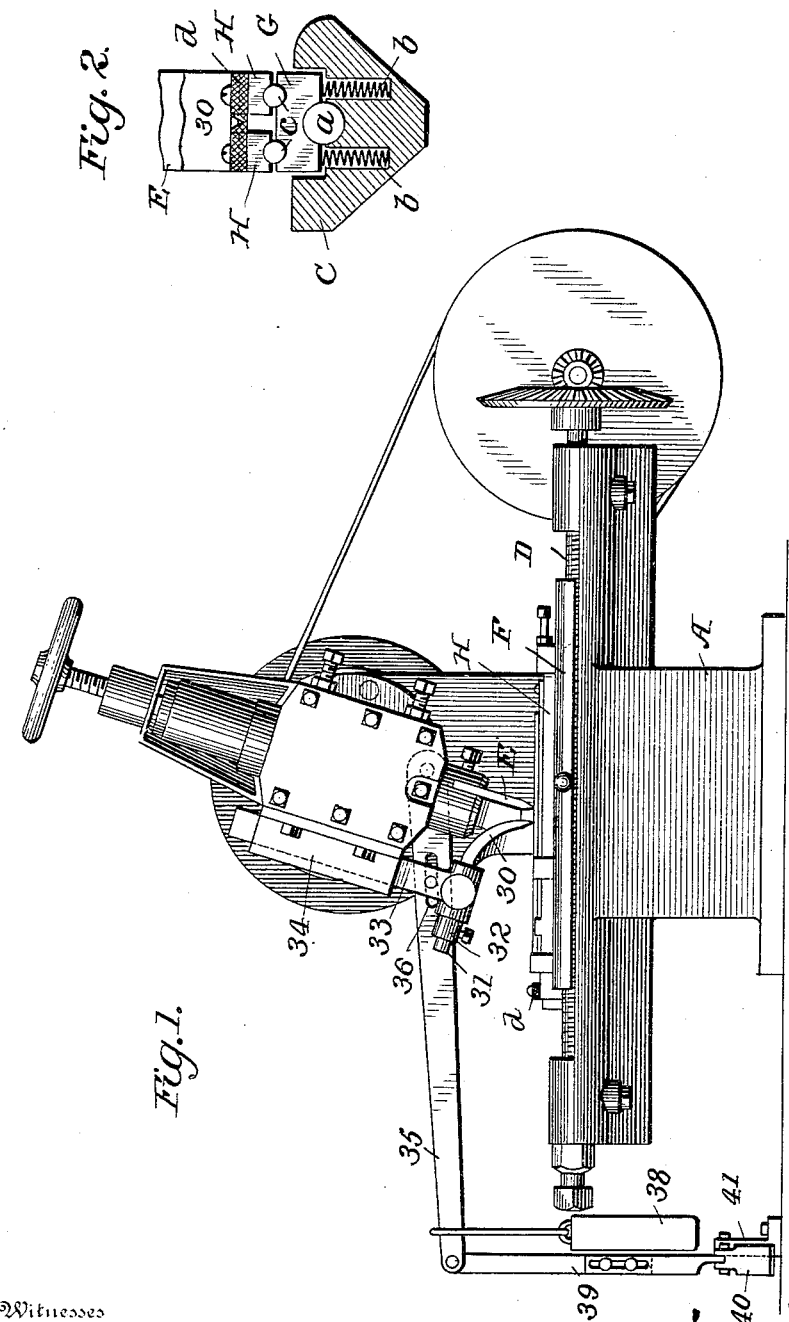

UNITED STATES PATENT OFFICE.

HENRY CHARLES BAILEY, OF KENT, OHIO, ASSIGNOR TO JAMES DWIGHT FOOT, OF NEW YORK, N. Y.

FILE OR RASP CUTTING MACHINE.

SPECIFICATION forming part of Letters Patent No. 625,236, dated May 16, 1899.

Application filed February 24, 1899. Serial No. 706,707. (No model.)

*To all whom it may concern:*

Be it known that I, HENRY CHARLES BAILEY, a citizen of the United States, residing at Kent, in the county of Portage and State of Ohio, have invented certain new and useful Improvements in File or Rasp Cutting Machines, of which the following is a specification.

This invention relates to a device specially adapted for use with the construction shown in a pending application, Serial No. 703,259, and has for its object to cut two file or rasp blanks simultaneously and yet produce articles which are regularly cut and uniform in character; and to this end my invention consists in providing the file or rasp cutting machine having blank-holding beds capable of rocking and vertical movements with a presser device adapted to accommodate itself to positions of the blanks, as illustrated in the accompanying drawings, in which—

Figure 1 is a side elevation showing one form of file-cutting apparatus provided with my improvements, and Fig. 2 is a transverse section of the blank-supporting parts.

My improvements are adapted to be used with file-cutting and in some cases with rasp-cutting machines of different constructions; but as shown they are applied in machines having a base A, carriage C, sliding longitudinally in a groove, and a propelling-screw D, with which the carriage may be connected, as desired, by turning down a wing F, while a cutter E reciprocates above the carriage under the action of well-known devices not necessary to be described.

Upon the carriage is mounted a member, which I term a "support" G, so as to be capable of rocking upon its central axis. This support may vibrate upon trunnions at the ends or may be otherwise supported so as to yield when pressure is brought against the top face upon either side of the longitudinal center. A preferable arrangement consists in recessing longitudinally both the support and the carriage, so as to receive a bearing-bar $a$, fitting said recesses, there being sufficient room between the lower face of the support and the upper face of the carriage to permit the desired rocking of the former. In recesses in the carriage, on opposite sides of the longitudinal center, are inserted springs $b$, which bear upon the support and tend to maintain it in a level position.

There are two beds H H for the file-blanks, arranged parallel to each other and each mounted to vibrate on its longitudinal center upon a bearing at the upper side of the support G. While any suitable means may be employed for so mounting the beds, I prefer to recess the upper face of the support and under faces of the beds to receive bearing-bars $c\ c$.

Suitable means is provided for normally maintaining the level positions of the beds— as, for instance, a transverse strip of rubber $d$, bolted to the upper face of each bed, tending to maintain both faces on the same plane, but permitting each bed to rock to a certain extent independent of the other. The upper face of each bed may be provided with a zinc or other facing, as usual, and the faces of the beds and of the file-blanks thereon are below the cutting-tool E, the reciprocation of which, in connection with the travel of the carriage, results in cutting the blanks transversely or diagonally at successive points.

The parts above described constitute no essential part of this invention, which is embodied in the parts which I will now describe.

A presser-foot 30 at its edge bears upon the surfaces of both file-blanks at a point just in advance of the cutter or cutters. The said presser-foot is formed with a shank 31, adapted to be received in the opening of a sleeve 32, carried by a rod or bar 33, and adapted to rotate freely therein in a direction transverse to the line of movement of the carriage or file blanks, and thereby conform to the faces of the file-blanks and hold them in the position to which they are turned by the blows of the cutter, which after the first or second blow brings the said blanks to a level position. The rod 33 is received in a socket or guide 34 and is adapted to be vertically adjusted therein, and the degree of pressure of the presser-foot upon the file-blanks is determined by a lever 35, which is pivoted at one end to the frame of the machine and has a slot 36 to receive a pin projecting from the rod or bar 33.

As a convenient means of maintaining pressure upon the lever 35 a weight 38 is connected adjustably to the outer end thereof, and in order that said lever may be lifted to carry the presser-foot out of contact with the file-blanks it is pivotally connected to a link 39, which is in turn connected to a foot-lever 40, pivoted intermediate its ends to a suitable support 41.

Without limiting myself to the precise construction and arrangement of parts shown, I claim as my invention—

1. In a file or rasp cutting machine, the combination of a plurality of yielding supports for file-blanks, mechanism for moving the same, cutting devices adapted to cooperate with the blank-supporting mechanism, and a presser-foot adapted to press upon but accommodate itself to the rocking movements of the blanks, substantially as described.

2. In a file or rasp cutting machine, the combination of a plurality of yielding supports for file-blanks, mechanism for moving the same, cutting devices adapted to cooperate with the blank-supporting mechanism, a presser-foot freely rotatable in a direction transverse to the line of movement of the file-blanks, and means for holding said presser-foot into contact with the file-blanks and for elevating it out of contact therewith, substantially as described.

3. A file or rasp cutting machine provided with a presser-foot adapted to cooperate with a plurality of file-blanks and mounted to turn in its support to yield freely in a direction transverse to the line of movement of the file-blanks, substantially as described.

In testimony whereof I have signed my name to this specification in the presence of two subscribing witnesses.

HENRY CHARLES BAILEY.

Witnesses:
C. M. DAVIS,
W. H. MELOY.